United States Patent
Boesch et al.

(10) Patent No.: US 9,886,034 B2
(45) Date of Patent: Feb. 6, 2018

(54) VEHICLE CONTROL BASED ON CONNECTIVITY OF A PORTABLE DEVICE

(71) Applicant: Ford Global Technologies, LLC, Dearborn, MI (US)

(72) Inventors: Mathew Alan Boesch, Plymouth, MI (US); Sarra Awad Yako, Allen Park, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 177 days.

(21) Appl. No.: 14/938,697

(22) Filed: Nov. 11, 2015

(65) Prior Publication Data

US 2017/0131714 A1 May 11, 2017

(51) Int. Cl.
| | | |
|---|---|---|
| *G01C 22/00* | (2006.01) | |
| *G05D 1/00* | (2006.01) | |
| *B60Q 9/00* | (2006.01) | |
| *B60W 10/04* | (2006.01) | |
| *B60W 10/18* | (2012.01) | |
| *B60W 10/20* | (2006.01) | |
| *B60W 30/182* | (2012.01) | |
| *B60W 50/08* | (2012.01) | |
| *B60K 28/06* | (2006.01) | |

(Continued)

(52) U.S. Cl.
CPC .......... *G05D 1/0061* (2013.01); *B60K 28/06* (2013.01); *B60Q 9/00* (2013.01); *B60W 10/04* (2013.01); *B60W 10/18* (2013.01); *B60W 10/184* (2013.01); *B60W 10/20* (2013.01); *B60W 30/182* (2013.01); *B60W 50/085* (2013.01); *G05D 1/0088* (2013.01); *B60W 2040/0818* (2013.01); *B60W 2040/0863* (2013.01); *B60W 2050/0064* (2013.01); *B60W 2400/00* (2013.01); *B60W 2520/10* (2013.01); *B60W 2540/04* (2013.01); *B60W 2540/22* (2013.01); *B60W 2540/26* (2013.01); *B60W 2710/18* (2013.01); *B60W 2710/20* (2013.01); *B60W 2720/10* (2013.01); *B60W 2900/00* (2013.01); *B60Y 2302/05* (2013.01)

(58) Field of Classification Search
CPC ...... B60W 10/04; B60W 10/18; B60W 10/20; B60W 30/182; G05D 1/0088; B60Q 9/00
USPC ........................................ 701/23, 36, 41, 46
See application file for complete search history.

(56) References Cited

U.S. PATENT DOCUMENTS

| 7,639,148 B2 | 12/2009 | Victor | |
| 8,768,539 B1 * | 7/2014 | Clement | B60W 10/18 701/2 |

(Continued)

OTHER PUBLICATIONS

"'Driverless car' at CES", Heather Kelly, CNN, Apr. 7, 2014, 10 pages.

(Continued)

*Primary Examiner* — Thomas G Black
*Assistant Examiner* — Luat T Huynh
(74) *Attorney, Agent, or Firm* — Frank A. MacKenzie; Bejin Bieneman PLC

(57) ABSTRACT

A vehicle computer is programmed to: detect a portable computing device communicatively coupled to the vehicle computer. The vehicle computer is further programmed to control at least one vehicle operation based at least in part on the presence of the portable device, the at least one vehicle operation including at least one of control of steering, propulsion, and brakes.

20 Claims, 2 Drawing Sheets

(51) Int. Cl.
*B60W 10/184* (2012.01)
*B60W 40/08* (2012.01)
*B60W 50/00* (2006.01)

(56) References Cited

U.S. PATENT DOCUMENTS

| | | | |
|---|---|---|---|
| 9,241,363 B2* | 1/2016 | Matsushita | H04W 76/025 |
| 2011/0077028 A1 | 3/2011 | Wilkes, III et al. | |
| 2013/0131905 A1 | 5/2013 | Green et al. | |
| 2013/0226408 A1 | 8/2013 | Fung et al. | |
| 2014/0058632 A1* | 2/2014 | Jungman | B60K 28/063 |
| | | | 701/48 |
| 2014/0300479 A1 | 10/2014 | Wolter et al. | |
| 2014/0375810 A1 | 12/2014 | Rodriguez | |
| 2015/0015386 A1 | 1/2015 | Langenhan | |
| 2015/0025746 A1* | 1/2015 | Yoshizawa | B60K 28/04 |
| | | | 701/41 |
| 2015/0094896 A1 | 4/2015 | Cuddihy et al. | |
| 2015/0105960 A1 | 4/2015 | Pilutti et al. | |
| 2015/0127208 A1* | 5/2015 | Jecker | B62D 15/025 |
| | | | 701/23 |
| 2015/0149017 A1* | 5/2015 | Attard | B60W 30/182 |
| | | | 701/23 |
| 2016/0068103 A1* | 3/2016 | McNew | B60Q 9/00 |
| | | | 701/23 |

OTHER PUBLICATIONS

GB UK Search Report 16403P, GB Appl. No. GB1618999.5 dated Apr. 27, 2017; 3 pages.

* cited by examiner

VEHICLE CONTROL BASED ON CONNECTIVITY OF A PORTABLE DEVICE

BACKGROUND

Self-driving (also referred to as autonomous) vehicles can allow vehicle operators to focus attention on things other than vehicle operations. However, it is typically desirable for an operator of an autonomous vehicle to be able to resume control of some or all vehicle operations, e.g., steering, throttling, and/or braking control, upon short notice, e.g., in a matter of seconds or less. However, there is a risk that if the vehicle operator is engaged in a non-driving task, e.g., a movie, game, or video conference, the operator might intentionally or unintentionally ignore a takeover request issued by a vehicle computer.

DRAWINGS

DETAILED DESCRIPTION

Introduction

Figure 1:
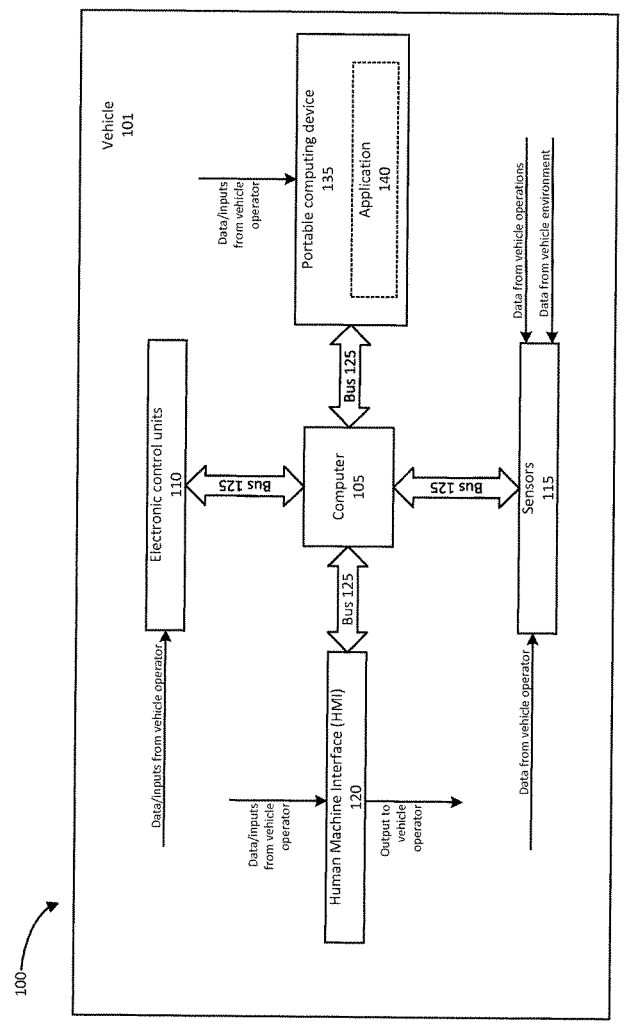
FIG. 1 illustrates an exemplary vehicle system for determining vehicle operations based on the connectivity of a portable device.

FIG. 1 is a block diagram of an exemplary vehicle 101 control system 100. The vehicle 101 includes a computer 105 that includes or is communicatively coupled to a human machine interface (HMI) 120, and also to a communications network or networks within the vehicle 101, e.g., wireless and/or wired communications that generally include a communication bus 125 such as is known to provide communications to and from vehicle 101 components and/or electronic control units 110, e.g., controllers for vehicle 101 steering, braking, throttling, etc. The computer 105 may receive data from ECUs and the like, as well as from sensors 115, relating to operating the vehicle 101. The computer 105 may also communicate with a portable computing device 135 using known protocols such as Bluetooth.

The computer 105 may send messages to the portable device 135 requesting operator input. The computer 105 may send a message to a device 135 periodically, e.g., every three minutes, every ten minutes, etc., to enhance operator attention to vehicle operations and/or ensure that the operator is alert and able to assume control of vehicle 101 operations if needed. Alternatively or additionally, the computer 105 may send a message requesting operator response when one or more operations of the vehicle 101 warrant operator attention, e.g., because of a risk of collision, because the computer 105 is unable to determine an appropriate control instruction for one or more vehicle components (or is unable to do so within a predetermined degree of confidence), etc., i.e., when manual control of the at least some of the vehicle 101 operations could be desired. The sent message may include instructions on how the operator may respond to the request, e.g., by selecting a provided soft key or the like, by answering a question, e.g., "What time is it?" or providing some other specified input. If the operator does not respond to the request within a pre-determined amount of time, the vehicle 101 computer 105 could be programmed to take one or more actions, such as suspending vehicle 101 operations (e.g., by pulling to a roadside or other safe location and stopping), maintaining autonomous control, actuating an audio output to obtain operator attention, etc., modifying a vehicle 101 route, etc.

Exemplary System Embodiments

The vehicle 101 computer 105 may be communicatively coupled to a communications bus 125 or other known wired or wireless connections, and/or the computer 105 may include, one or more electronic control units 110, e.g., controllers or the like included in the vehicle 101 for monitoring and/or controlling various vehicle 101 components, e.g., an engine control unit (ECU), transmission control unit (TCU), etc. The bus 125 may be a controller area network (CAN) bus or any other suitable protocol such as JASPAR, LIN, SAE J1850, AUTOSAR, MOST, etc. Electronic control units 110 may be connected to, e.g., a CAN bus, as is known. The vehicle 101 may also include one or more electronic control units 110 specifically for receiving and transmitting diagnostic information such as an onboard diagnostics connector (OBD-II). Via the bus 125 and/or other wired or wireless mechanisms, the computer 105 may transmit messages to various devices in the vehicle 101 and/or receive messages from the various devices, e.g., controllers, actuators, etc. Alternatively or additionally, in cases where the computer 105 actually comprises multiple devices, the bus 125 may be used for communications between devices represented as the computer 105 in this disclosure, e.g., various ECUs.

The computer 105 may include or be coupled to one or more transceivers such as is known to transmit and/or receive messages to and/or from, as well as within, the vehicle 101. The computer 105 may transmit and/or receive messages using a plurality of communication protocols, e.g., Dedicated Short Range Communication (DSRC), cellular modem, short-range radio frequency, IEEE 802.11 ("WiFi"), Bluetooth, etc.

The vehicle 101 may include a variety of sensors 115. The sensors 115 may be linked to electronic control units 110 and operate within a CAN bus protocol or any other suitable protocol, as described above. The sensors 115 may both transmit and receive data. The sensors 115 may communicate with the computer 105 or other electronic control unit via e.g., the CAN bus protocol, to process information transmitted from or received by the sensors 115. The sensors 115 may communicate with the computer 105 or an electronic control unit 110 via any suitable wireless and/or wired manner. The sensors 115 may include any assortment of a camera, a RADAR unit, a LADAR unit, a sonar unit, a breathalyzer, a motion detector, etc. Additionally, the sensors 115 may include a global positioning system (GPS) receiver that may communicate with a global positioning system satellite connected to a network, etc.

The sensors 115 may further include one or more biometric sensors, i.e., devices that measure one or more characteristics of a human operator as is known, e.g., heartrate, respiration, pupil dilation, facial expression, movement, etc. For example, the plurality of biometric sensors may be a heart rate monitor, e.g., that uses photoplethysmography, an image sensor that measures facial color changes, etc., a pupil size and stability monitor, e.g., such as a pupilometer, etc., and/or a respiration monitor, e.g., that measures acoustic signals, temperature variations near the nostrils, changes in $CO_2$ levels in the vehicle 101, etc. The biometric sensors may use, for example, a camera in the vehicle 101 and/or the vehicle 101 computer 105. Other examples of biometric sensors are possible.

The biometric sensors may be disposed in the vehicle 101 in any suitable location. For example, the heart rate monitor may be disposed within the vehicle 101 steering wheel, the pupil size and pupil stability monitor may include the camera disposed, for example, on or in the vehicle 101 dash board, and the respiratory monitor may be disposed within and/or on the vehicle 101 seatbelt.

The vehicle 101 computer 105 may include one or more memory devices. The memory device may include a main memory device, i.e., a volatile memory device, and/or an auxiliary storage device that may be internal or external to the rest of the computer, e.g., an external hard drive. The memory device may communicate with the computer 105 and may store the data transmitted over the CAN bus protocol by the electronic control units. Data may also include data calculated and processed as an output by the computer 105.

The vehicle 101 may include a human machine interface (HMI) 120. The HMI 120 may allow an operator of the vehicle 101 to interface with the computer 105, with electronic control units, etc. HMI 120 may include known components within or coupled to the computer 105, such as interactive voice response (IVR) and/or a graphical user interface (GUI), including e.g., a touchscreen or the like, etc.

The vehicle 101 may include one or more communications buses 125, as stated above, whereby the computer 105 may communicate with various vehicle systems and components, such as a navigation system, a brake system, a suspension system, a steering system, a powertrain system, etc. The HMI 120 may be used to display information based on data received via the bus 125.

The computer 105 may be communicatively coupled to one or more portable computing devices 135. The portable device 135 may be wearable by an operator, e.g., may be affixed to a wrist or other body part, e.g., Apple watch, Microsoft Band, etc., or may be a laptop, tablet, smartphone, etc. The portable device 135 accordingly may include any one of a variety of computing devices including a processor and a memory, as well as communications capabilities, e.g., using IEEE 802.11, using Bluetooth, using cellular communications protocols, etc. The portable device 135 may communicate directly with the vehicle 101 computer 105, e.g., using Bluetooth, etc. The portable device 135 may also communicate with the operator through visual, auditory, haptic and/or tactile, etc. mechanisms. The portable device 135 may include a visual interface, e.g., a screen, for displaying GUIs (graphical user interfaces). Further, the device 135 may include sensors such as are known for obtaining biometric data, e.g., heartrate, pupil dilation, etc., and also other sensors such as an accelerometer or the like for making determinations related to motion of the device 135, e.g., that might reflect motion of a human operator, a vehicle 101, etc.

The portable device 135 is programmed to display one or more messages on the portable device 135 GUI for receipt by the operator. Additionally or alternatively, the portable device 135 may receive operator input in response to the one or more messages and may send the received operator input to the vehicle 101 computer 105.

The portable device 135 may include one or more applications 140, i.e., one or more computer programs executable by the portable device 135 in a known manner. For example, the applications 140 may include one or more "apps" such as are commonly known. Data from the vehicle 101 computer 105 may be provided to an application 140, and, moreover, an application 140 may provide output to a vehicle operator, e.g., sounds, haptic output, visual display and/or may be programmed to generate communications to the vehicle 101 computer 105, e.g., indicating whether a vehicle 101 operator has provided input, the content of the input, etc. As discussed further below, one or more applications 140 may be prevented from executing absent an instruction from the vehicle 101 computer 105, e.g., based on a determination by the computer 105 that a vehicle 101 operator's attention is not needed for operation of the vehicle 101.

The vehicle 101 computer 105 may be programmed to recognize, e.g., to identify, an operator and/or the portable device 135 of the operator using stored parameters, e.g., using face recognition or other known techniques.

Exemplary Process Flows

Figure 2:
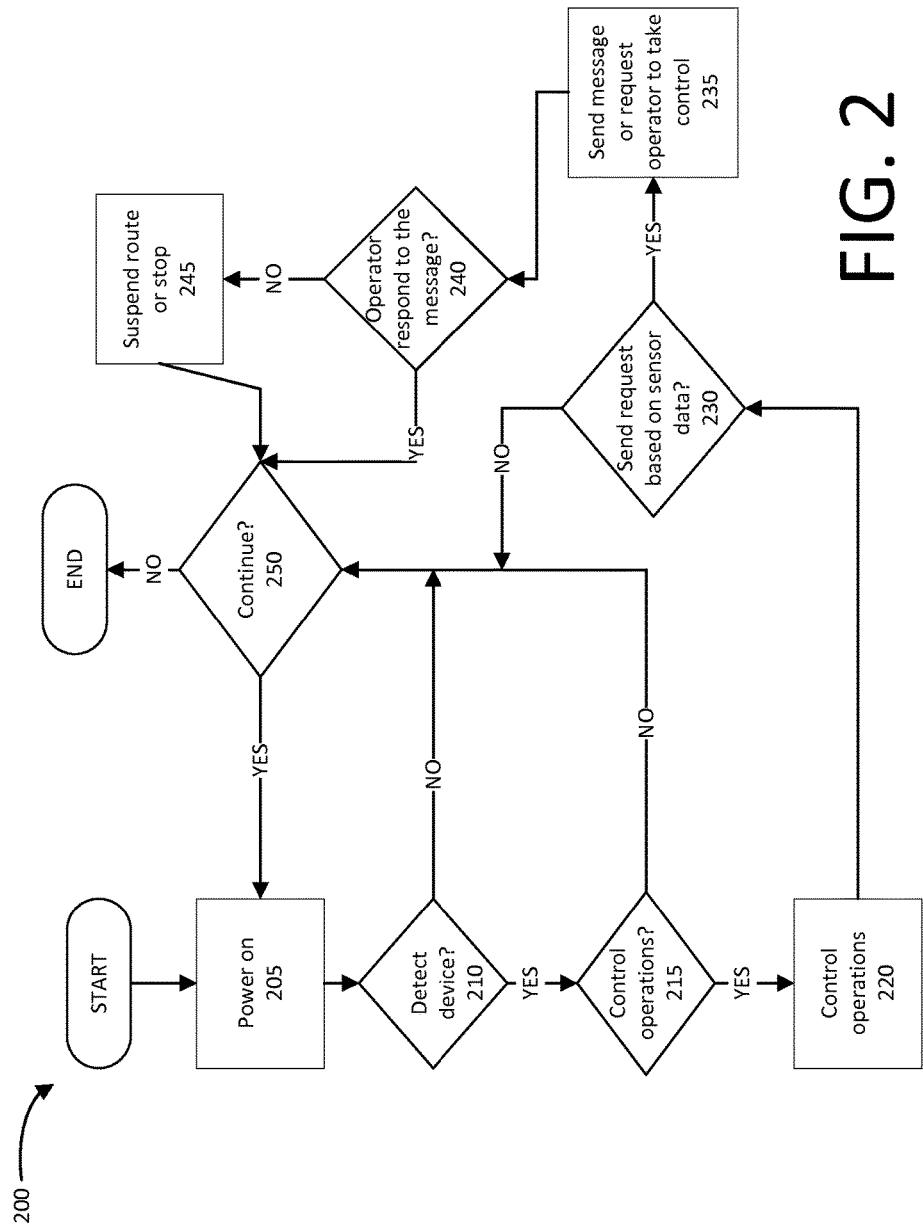
FIG. 2 is a diagram of an exemplary process that may be implemented in a computer for determining vehicle operations based on the connectivity of the portable device.

FIG. 2 is a diagram of an exemplary process that may be implemented in a computer for determining vehicle operations based on the connectivity of the portable device 135.

The process 200 begins in a block 205 in which the portable device 135 is powered on.

After powering on, in a block 210, the vehicle 101 computer 105 detects the portable device 135 and determines whether the portable device 135 may receive messages from the vehicle 101 computer 105. The computer 105 may also confirm that a detected portable device 135 is associated with a vehicle 101 operator, e.g., where more than one portable device 135 is detected, e.g., by requesting operator input, according to an identifier for the device 135, etc. The portable device 135 may include programming to communicate with the computer 105, e.g., in the form of an "app" or the like, such as is known. If the portable device 135 is detected, the process 200 proceeds to a block 215. Otherwise, the process 200 proceeds to a block 250.

In the block 215, after the vehicle 101 computer 105 detects the portable device 135, the vehicle 101 computer 105 determines whether one or more vehicle 101 operations, e.g., steering, throttling, braking, are being controlled exclusively by or at least in part by the vehicle 101 computer 105. If the vehicle 101 computer 105 determines that it is controlling, either exclusively or partially, any of the vehicle 101 operations, the process 200 proceeds to a block 220. Otherwise, the process 200 proceeds to the block 250.

In the block 220, the vehicle 101 continues to control vehicle 101 operations, e.g., one or more of steering, throttling, and braking.

Next in a block 230, the computer 105 determines if a request for operator input is to be sent to the portable device 135 for response by the operator based on data received from sensors 115 relating to vehicle 101 operations. Such data may relate to vehicle 101 speed, heading, steering angle, brake actuation, engine torque demand, propulsion setting (e.g., throttle setting for an internal combustion engine, setting for an electric motor, etc.), detected roadway obstacles, planned vehicle 101 route, etc., just to provide a few examples from many possible. In some cases, as noted above, the computer 105 may be programmed to provide such messages periodically, in which case the block 230 includes determining whether a predetermined amount of time has passed since the process 200 began, or since a prior message.

Further, a periodicity, or pre-determined interval, of messages, may be set dynamically and/or modified during execution of the process 200 based on factors relating to operation of the vehicle 101, e.g., a location and surrounding environment of the vehicle 101, e.g., traveling in traffic or on a highway, during inclement weather conditions, etc. For example, if the vehicle 101 is traveling in traffic then the computer 105 may send the notification to the portable device 135 to determine whether the operator is responsive more frequently than if the vehicle 101 is not traveling in traffic, as vehicle-to-vehicle interactions between the vehicle 101 and the surround vehicles may more frequently put a greater burden on the operator.

Yet further, such factors or other factors relating to vehicle 101 operation could be used to determine to send a message as an alternative, or in addition to, the pre-determined interval between messages. For example, a determination by a collision avoidance system of a risk of an impending collision above a predetermined threshold, a recommendation that a vehicle 101 route change, e.g., due to heavy detected traffic, a detection of a possible obstacle or roadway hazard, and/or an identification of a complicated driving maneuver (CDM), etc. A CDM is a predetermined driving maneuver in which the computer 105 is programmed to require that the operator manually control at least one of the vehicle 101 operations. For example, the vehicle 101 may have to rapidly cross several lanes after entering a highway to take an imminent exit on an opposite side. Vehicle operations considered CDMs may be pre-determined according to input from the operator and/or default settings, for example.

The computer 105 may determine to issue the message to request operator input to the portable device 135 if the computer 105 determines that the vehicle 101 route, as determined by, e.g., a navigation system (utilizing GPS), etc., is approaching a CDM. Additionally or alternatively, the sensors 115 of the vehicle 101 may determine substantially in real-time whether the vehicle 101 operation is a CDM. Based on the sensor 115 measurements, the computer 105 may message the operator by at least one of audible output, visual output, and haptic output.

Additionally or alternatively, the vehicle 101 sensors 115 may include biosensors. The biosensors may measure the responsiveness of the operator, e.g., alertness, etc. The biosensors may measure whether the operator may be unresponsive because of a medical emergency, e.g., such as a heart attack, seizure, hyperglycemia, etc. The computer 105 may determine whether to send a request to the portable device 135 based at least in part on the biosensor measurements indicating possible unresponsiveness of the operator.

If the vehicle 101 computer 105 determines to send the message to request operator input, the process 200 proceeds to a block 235. Otherwise, the process 200 proceeds to the block 250.

In the block 235, the vehicle 101 computer 105 sends the message to request operator input to the portable device 135. The message may simply request operator input to confirm that the operator is available if needed for vehicle 101 operations, even if such need is not presently detected. For example, it may be useful to periodically confirm that a vehicle 101 operator is conscious and/or awake. However, input may be requested that the operator confirm a present ability to control some or all vehicle 101 operations based on factors such as discussed above. The portable device 135 may conspicuously display the message to the operator, e.g., by pausing and/or suspending operations occurring on the portable device 135 until if and when operator input is received. In any event, a request for operator input may specify the manner in which the operator should respond to the request. While the computer 105 may request that the operator manually control at least one vehicle operation, the computer 105 may also request that the operator only respond to the request without taking manual control of the vehicle, e.g., respond by pushing a button on the portable device 135, etc.

For example, the vehicle 101 computer 105 may send a message to the portable device 135 that requests the operator to respond to the message within a pre-determined amount of time. The message may instruct the operator on how to respond to the message. For example, the operator may respond by selecting an option on the GUI of the portable device 135.

As mentioned above, a pre-determined interval between messages can be determined based on various factors, e.g., vehicle 101 speed, route, and/or the received sensor data from the portable device 135, etc. For example, the vehicle 101 computer 105 may allow for a greater amount of time to respond to the message when the vehicle 101 is moving at a first speed, and a lesser amount of time to respond when the vehicle 101 is moving at a second speed faster than the first speed.

Next, in a block 240, the vehicle 101 computer 105 determines whether the operator has provided requested input via the device 135. If the computer 105 does not receive a message response from the portable device 135, the process 200 proceeds to a block 245. Otherwise, the process 200 proceeds to the block 250.

In the block 245, after the vehicle 101 computer 105 does not receive a requested message response from the portable device 135, the vehicle 101 computer 105 may modify control of the vehicle 101, e.g., by stopping the vehicle 101 (moving the vehicle 101 to a road shoulder), suspending the automated control of the vehicle 101, changing the route of the vehicle 101, etc., and/or the computer 105 may implement control of various vehicle components to prevent an operator from controlling vehicle operations such as braking, throttling, and/or steering. The computer 105 may modify control of the vehicle 101 based at least in part on received data from external sources, e.g., a remote server, surrounding vehicles and infrastructure, etc.

Following any of the blocks 210, 215, 230, 240, or 245, in the block 250, the vehicle 101 computer 105 determines whether the process 200 should continue. For example, the process 200 may end if the vehicle 101 turns off the process 200, if the vehicle is switched off, etc. In any case, if the process 200 should not continue, the process 200 ends following the block 250. Otherwise, the process 200 returns to the block 205.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
a vehicle computer comprising a processor and a memory, the memory storing instructions executable by the processor to:
detect a portable computing device communicatively coupled to the vehicle computer;
control at least one vehicle operation based at least in part on detecting the portable device, wherein the at least one vehicle operation includes at least one of control of steering, propulsion, and brakes;
request operator input from the portable device; and
end control of the at least one vehicle operation upon failing to receive the input within a predetermined amount of time.

2. The system of claim 1, wherein the vehicle computer is further programmed to end control of the at least one vehicle operation upon determining that the portable device is not in communication with the vehicle computer.

3. The system of claim 1, wherein the vehicle computer is further programmed to detect a plurality of portable devices communicatively coupled to the vehicle computer, to identify at least one of the plurality of portable devices as associated with a vehicle operator, and to request the operator input from the one of the plurality of portable devices associated with the vehicle operator.

4. The system of claim 1, wherein the vehicle computer is further programmed to receive data from one or more sensors communicatively coupled to the vehicle computer and to control the at least one vehicle operation based at least in part on the received operator input and received sensor data from the portable device.

5. The system of claim 1, wherein the predetermined amount of time is in part determined by at least one of the vehicle speed, the vehicle course, and received sensor data from the portable device.

6. The system of claim 1, wherein the vehicle computer is further programmed to instruct the portable device to suspend operation of at least one application on the portable device until receiving the operator input.

7. The system of claim 1, wherein the vehicle computer is further programmed to message the operator by at least one of audible output, visual output, and haptic output based on the sensor data.

8. The system of claim 1, wherein the vehicle computer is further programmed to control based at least in part on biometric sensor data from the portable device.

9. The system of claim 8, wherein the biometric sensor data includes at least one of a heart rate, a pupil dilation, and data indicating motion of a vehicle operator.

10. The system of claim 1, wherein the vehicle computer is further programmed to at least one of end control of the at least one vehicle operation and modify control of the at least one vehicle operation, based at least in part on data received from vehicle sensors communicatively coupled to the vehicle computer, upon failing to receive the input within a predetermined amount of time.

11. The system of claim 1, wherein the predetermined amount of time is in part determined based on a location and surrounding environment of the vehicle.

12. A method, comprising:
detecting, in a vehicle computer, a portable device communicatively coupled to the vehicle computer;
based at least in part on detecting the portable device, controlling at least one vehicle operation, wherein the at least one vehicle operation includes at least one of control of steering, propulsion, and brakes;
requesting operator input from the portable device; and
ending control of the at least one vehicle operation upon failing to receive the input within a predetermined amount of time.

13. The method of claim 12, further comprising ending control of the at least one vehicle operation upon determining that the portable device is not in communication with the vehicle computer.

14. The method of claim 12, further comprising detecting a plurality of portable devices communicatively coupled to the vehicle computer;
identifying at least one of the plurality of portable devices as associated with a vehicle operator; and
requesting the operator input from the one of the plurality of portable devices associated with the vehicle operator.

15. The method of claim 12, further comprising receiving data from one or more sensors communicatively coupled to the vehicle computer; and
controlling the at least one vehicle operation based at least in part on the received operator input and received sensor data from the portable device.

16. The method of claim 12, wherein the predetermined amount of time is in part determined by at least one of the vehicle speed, the vehicle course, and received sensor data from the portable device.

17. The method of claim 16, further comprising instructing the portable device to suspend operation of at least one application on the portable device until receiving the operator input.

18. The method of claim 16, further comprising messaging the operator by at least one of audible output, visual output, and haptic output based on the sensor data.

19. The method of claim 12, further comprising controlling based at least in part on biometric sensor data from the portable device.

20. The method of claim 12, further comprising at least one of ending control of the at least one vehicle operation and modifying control of the at least one vehicle operation, based at least in part on data received from vehicle sensors communicatively coupled to the vehicle computer, upon failing to receive the input within a predetermined amount of time.

* * * * *